United States Patent
Saito

(10) Patent No.: US 10,096,853 B2
(45) Date of Patent: Oct. 9, 2018

(54) METHOD OF DETECTING ABNORMALITY IN PRESSURE SENSOR AND FUEL CELL SYSTEM

(71) Applicant: TOYOTA JIDOSHA KABUSHIKI KAISHA, Toyota-shi, Aichi-ken (JP)

(72) Inventor: Hiromu Saito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 16 days.

(21) Appl. No.: 15/440,324

(22) Filed: Feb. 23, 2017

(65) Prior Publication Data

US 2017/0250421 A1 Aug. 31, 2017

(30) Foreign Application Priority Data

Feb. 25, 2016 (JP) .................. 2016-034496

(51) Int. Cl.

| | |
|---|---|
| *H01M 8/04* | (2016.01) |
| *B60L 11/18* | (2006.01) |
| *H01M 8/04664* | (2016.01) |
| *H01M 8/0438* | (2016.01) |
| *H01M 8/04746* | (2016.01) |

(Continued)

(52) U.S. Cl.
CPC ..... *H01M 8/04664* (2013.01); *B60L 11/1881* (2013.01); *H01M 8/04388* (2013.01); *H01M 8/04402* (2013.01); *H01M 8/04753* (2013.01); *H01M 8/04761* (2013.01); *H01M 8/04992* (2013.01); *H01M 2008/1095* (2013.01); *H01M 2250/20* (2013.01); *Y02T 90/32* (2013.01)

(58) Field of Classification Search
CPC ......... H01M 8/04664; H01M 8/04388; H01M 8/04402; H01M 8/04753; H01M 8/04761; H01M 8/04992; H01M 2008/1095; H01M 2250/20; B60L 11/1881; Y02T 90/32; G01F 25/0007

USPC .................................................. 73/1.35, 1.57
See application file for complete search history.

(56) References Cited

U.S. PATENT DOCUMENTS

| | | | | |
|---|---|---|---|---|
| 8,522,597 | B2 * | 9/2013 | Pechtold | ............... G01L 27/005 73/1.57 |
| 2008/0220303 | A1 * | 9/2008 | Yoshida | ............ H01M 8/04097 429/423 |
| 2009/0064764 | A1 * | 3/2009 | Kizaki | .................. B60L 3/0046 73/40.5 R |

FOREIGN PATENT DOCUMENTS

| | | |
|---|---|---|
| JP | 2008-234970 | 10/2008 |
| JP | 2011-204411 A | 10/2011 |
| JP | 2015-031187 A | 2/2015 |

* cited by examiner

*Primary Examiner* — Renee Luebke
*Assistant Examiner* — Paul Baillargeon
(74) *Attorney, Agent, or Firm* — Finnegan, Henderson, Farabow, Garrett & Dunner, LLP

(57) ABSTRACT

Disclosed is a method of detecting an abnormality in a first pressure sensor or a second pressure sensor of a fuel cell system including the upstream-side first pressure sensor and the downstream-side second pressure sensor provided in a fuel supply flow passage configured to connect a fuel cell and a fuel supply source, a pressure reducing valve, a first shutoff valve, and a second shutoff valve. The first shutoff valve is closed to shut off supply of fuel from the fuel supply source. a pressure on an upstream side and a pressure on a downstream side of the pressure reducing valve is decreased to be equal to or less than a pressure regulation lower limit value. The second shutoff valve is closed and detection (Continued)

pressure values of the first pressure sensor and the second pressure sensor are compared with each other.

7 Claims, 2 Drawing Sheets

(51) Int. Cl.
    *H01M 8/04992*    (2016.01)
    *H01M 8/1018*     (2016.01)

METHOD OF DETECTING ABNORMALITY IN PRESSURE SENSOR AND FUEL CELL SYSTEM

INCORPORATION BY REFERENCE

The disclosure of Japanese Patent Application No. 2016-034496 filed on Feb. 25, 2016 including the specification, drawings and abstract is incorporated herein by reference in its entirety.

BACKGROUND OF THE INVENTION

1. Field of the Invention

The present invention relates to a method of detecting an abnormality in a pressure sensor and a fuel cell system.

2. Description of Related Art

A fuel cell system including a fuel cell configured to receive supply of reactant gas (fuel gas and oxidant gas) and to generate electric power has been suggested and has been put into practical use. The fuel cell is an electric power generation system which oxidizes fuel by an electrochemical process and directly converts energy discharged in an oxidation reaction to electric energy.

At present, a technique has been suggested in which a pressure sensor or a control valve (an injector or a regulator) is provided in a fuel supply flow passage connecting a fuel supply source and a fuel cell of a fuel cell system, and the control valve is controlled to be turned on or off based on a detection value of the pressure sensor, thereby regulating a fuel supply amount to the fuel cell. In recent years, various techniques for detecting an abnormality in a pressure sensor for use in regulating a fuel injection amount have been suggested. For example, a technique in which fault determination of a pressure sensor is performed by comparing a pressure difference calculated based on a hydrogen consumption amount with a pressure difference actually detected by the pressure sensor has been suggested (for example, see Japanese Patent Application Publication No. 2008-234970 (JP 2008-234970 A)).

SUMMARY OF THE INVENTION

However, even if the technique described in JP 2008-234970 A is employed, there is a possibility that it is not possible to detect offset fault (a shift of the detection value of the pressure sensor to a plus side or a minus side by a specific value) of the pressure sensor. In order to detect such offset fault, it is also conceivable that a plurality of pressure sensors are provided in the same pressure space and detection values of both pressure sensors are compared with each other however, if the sensor for comparison is provided in this way, manufacturing costs of the system increase.

The invention provides a method of detecting offset fault of a pressure sensor without providing a sensor for comparison.

A method according to an aspect of the invention is a method of detecting an abnormality of a pressure sensor in a fuel cell system including a fuel supply flow passage configured to connect a fuel cell and a fuel supply source, a first pressure sensor provided in the fuel supply flow passage, a second pressure sensor provided on a downstream side of the fuel supply flow passage from the first pressure sensor, a pressure reducing valve provided between the first pressure sensor and the second pressure sensor in the fuel supply flow passage and configured to decrease a pressure on an upstream side to a predetermined pressure regulation lower limit value, a first shutoff valve provided between the fuel supply source and the first pressure sensor in the fuel supply flow passage, and a second shutoff valve provided between the second pressure sensor and the fuel cell in the fuel supply flow passage. The method includes closing the first shutoff valve to shut off supply of fuel from the fuel supply source to the first pressure sensor, after shutting off the supply of fuel from the fuel supply source to the first pressure sensor, opening the second shutoff valve and allowing fuel in the fuel supply flow passage to be supplied to the fuel cell to decrease a pressure on an upstream side and a pressure on a downstream side of the pressure reducing valve to be equal to or less than the pressure regulation lower limit value, and after decreasing the pressure on the upstream side and the pressure on the downstream side of the pressure reducing valve to be equal to or less than the pressure regulation lower limit value, closing the second shutoff valve and comparing detection pressure values of the first pressure sensor and the second pressure sensor with each other to determine whether or not the first pressure sensor or the second pressure sensor is abnormal.

A fuel cell system according to another aspect of the invention includes a fuel supply flow passage configured to connect a fuel cell and a fuel supply source, a first pressure sensor provided in the fuel supply flow passage, a second pressure sensor provided on a downstream side of the fuel supply flow passage from the first pressure sensor, a pressure reducing valve provided between the first pressure sensor and the second pressure sensor in the fuel supply flow passage and configured to decrease a pressure on an upstream side to a predetermined pressure regulation lower limit value, a first shutoff valve provided between the fuel supply source and the first pressure sensor in the fuel supply flow passage, a second shutoff valve provided between the second pressure sensor and the fuel cell of the fuel supply flow passage, and a control determination unit configured to control the shutoff valves and to determine whether or not the pressure sensors are abnormal. The control determination unit closes the first shutoff valve to shut off supply of fuel from the fuel supply source to the first pressure sensor, then, opens the second shutoff valve and allows fuel in the fuel supply flow passage to be supplied to the fuel cell to decrease a pressure on an upstream side and a pressure on a downstream side of the pressure reducing valve to be equal to or less than the pressure regulation lower limit value, and subsequently, closes the second shutoff valve and compares detection pressure values of the first pressure sensor and the second pressure sensor with each other to determine whether or not the first pressure sensor or the second pressure sensor is abnormal.

If such a configuration and a method are employed, in a state in which the first shutoff valve and the second shutoff valve are operated to decrease the pressure on the upstream side and the pressure on the downstream side of the pressure reducing valve to be equal to or less than the predetermined pressure regulation lower limit value (a state in which the pressure on the upstream side and the pressure on the downstream side of the pressure reducing valve are made equal to each other), the detection pressure values of the first pressure sensor and the second pressure sensor are compared with each other, whereby it is possible to detect offset fault of the pressure sensors. Therefore, there is no need for providing a sensor for comparison for detecting offset fault of the first pressure sensor (or the second pressure sensor), and simplification (non-redundancy) of the configuration becomes possible. For this reason, it is possible to suppress an increase in manufacturing costs of the system.

In the method according to the aspect of the invention, a control determination unit of the fuel cell system may shut off the supply of fuel from the fuel supply source to the first pressure sensor and the control determination unit of the fuel cell system may decrease the pressure on the upstream side and the pressure on the downstream side of the pressure reducing valve to equal to or less than the pressure regulation lower limit value, and the control determination unit of the fuel cell system may execute the determination regarding whether or not the first pressure sensor or the second pressure sensor is abnormal.

In the method according to the aspect of the invention, decreasing the pressure on the upstream side and the pressure on the downstream side of the pressure reducing valve to be equal to or less than the pressure regulation lower limit value may be a state in which the pressure on the upstream side and the pressure on the downstream side of the pressure reducing valve are made equal to each other.

In the method according to the aspect of the invention, in a case where a difference between the detection pressure values of the first pressure sensor and the second pressure sensor exceeds a predetermined threshold, it may be determined that the first pressure sensor or the second pressure sensor is abnormal.

In the method according to the aspect of the invention, waveforms of the detection pressure values of the first pressure sensor and the second pressure sensor may be compared with each other, and in a case where a difference between waveforms of the first pressure sensor and the second pressure sensor exceeds a predetermined reference, it may be determined that the first pressure sensor or the second pressure sensor is abnormal.

In the method according to the aspect of the invention, it may be determined whether or not the first pressure sensor is abnormal based on a hydrogen consumption amount estimated from an amount of generated electric power of the fuel cell.

If such a method is employed, it is possible to automatically detect offset fault of the pressure sensors in the control determination unit of the fuel cell system.

According to the aspect of the invention, it is possible to provide a method of detecting offset fault of the pressure sensors without providing a sensor for comparison.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
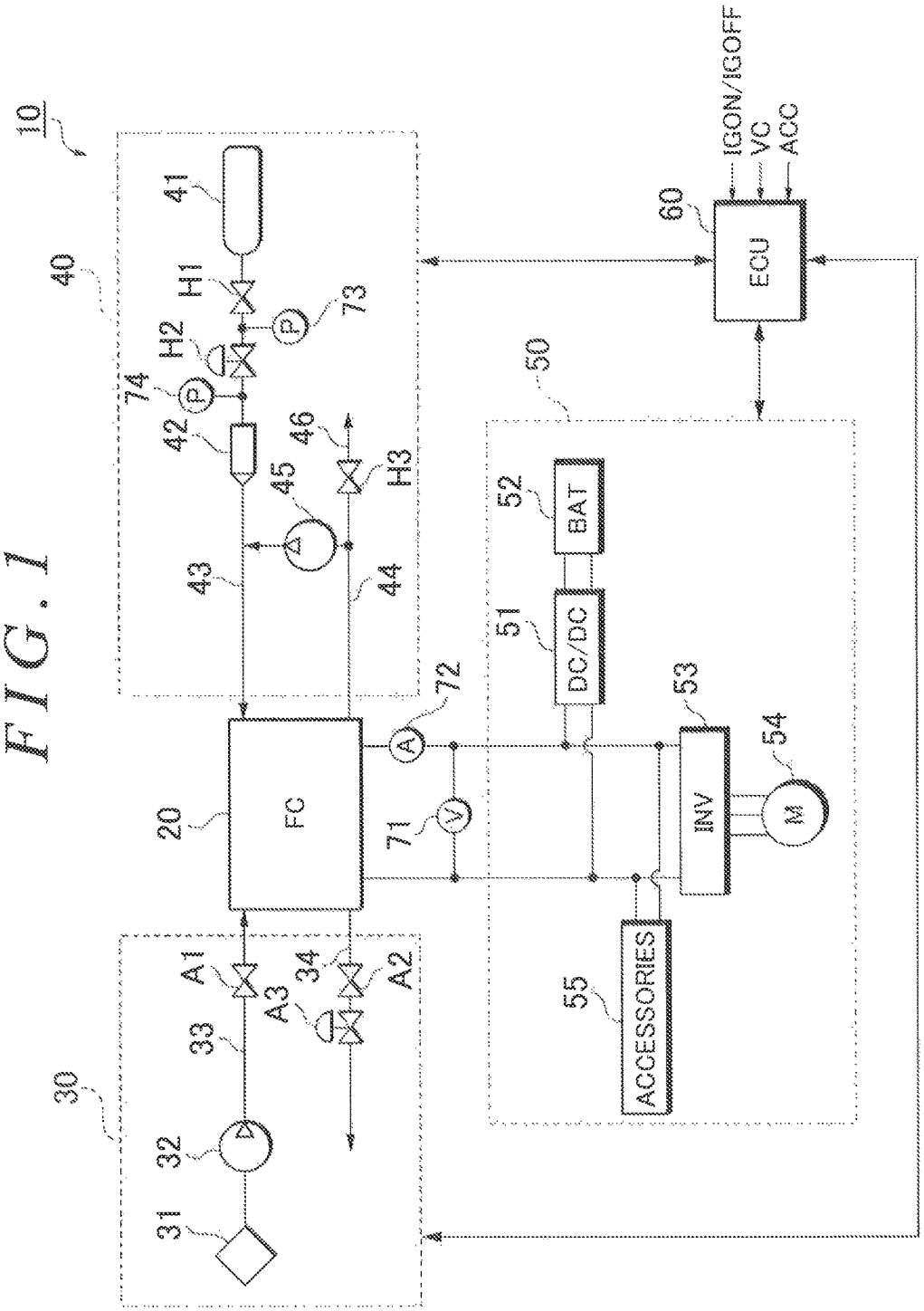
FIG. 1 is an explanatory view showing the outline of the configuration of a fuel cell system according to an embodiment of the invention.

Hereinafter, an embodiment of the invention will be described referring to the drawings. The positional relationships, such as up, down, right, and left, of the drawings are based on the positional relationships shown in the drawings unless otherwise specified. The dimension ratios of the drawings are not limited to the ratios shown in the drawings. In addition, the following embodiment is an example for describing the invention, and the invention is not intended to be limited to the embodiment. Furthermore, various modifications can be made as long as the modifications do not depart from the spirit and scope of the invention.

First, the configuration of a fuel cell system 10 according to this embodiment will be described referring to FIG. 1. The fuel cell system 10 functions as, for example, an in-vehicle electric power supply system which is mounted in a fuel cell vehicle as a moving object, and includes a fuel cell 20 which receives supply of reactant gas (fuel gas and oxidant gas) to generate electric power, an oxidant gas supply system 30 which supplies air as oxidant gas to the fuel cell 20, a fuel gas supply system 40 which supplies hydrogen gas as fuel gas to the fuel cell 20, an electric power system 50 which controls charging and discharging of electric power, and a controller 60 which integrally controls the entire system.

The fuel cell 20 is a solid polymer electrolyte cell stack in which multiple cells are laminated in series. In the fuel cell 20, an oxidation reaction represented by Formula (1) occurs on an anode electrode, and a reduction reaction represented by Formula (2) occurs on a cathode electrode. As the whole of the fuel cell 20, an electromotive reaction represented by Formula (3) occurs.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

Each cell constituting the fuel cell 20 is constituted of a polymer electrolyte membrane, an anode electrode, a cathode electrode, and a separator. The anode electrode and the cathode electrode form a sandwich structure with the polymer electrolyte membrane sandwiched from both sides. The separator is constituted of a gas impermeable conductive member, and forms flow passages of fuel gas and oxidant gas between the anode electrode and the cathode electrode while sandwiching the anode electrode and the cathode electrode from both sides.

Each of the anode electrode and the cathode electrode has a catalyst layer and a gas diffusion layer. The catalyst layer has catalyst-supported carbon functioning as a catalyst with, for example, platinum-based noble metal particles supported thereon, and a polymer electrolyte. As a material of the platinum system of the noble metal particles, for example, metal catalysts (Pt, Pt—Fe, Pt—Cr, Pt—Ni, Pt—Ru, and the like) can be used. As catalyst-supported carbon, for example, carbon black can be used. As the polymer electrolyte, proton conductive ion exchange resin or the like can be used. The gas diffusion layer is formed on the surface of the catalyst layer to have air permeability and electronic conductivity, and is formed of carbon cloth, carbon paper, or carbon felt formed of threads of carbon fiber.

The polymer electrolyte membrane is a proton conductive ion exchange membrane formed of a solid polymer material, for example, fluorine-based resin, and exhibits satisfactory electric conductivity in a wet state. The polymer electrolyte membrane, the anode electrode, and the cathode electrode form a membrane-electrode assembly.

As shown in FIG. 1, a voltage sensor 71 which detects an output voltage (FC voltage) of the fuel cell 20 and a current sensor 72 which outputs an output current (FC current) of the fuel cell 20 are attached to the fuel cell 20. The FC voltage and the FC current detected by the voltage sensor 71 and the current sensor 72 are used for calculation of an electric power generation amount (FC electric power generation amount) of the fuel cell 20 described below.

The oxidant gas supply system 30 has an oxidant gas flow passage 33 in which oxidant gas supplied to the cathode electrode of the fuel cell 20 flows, and an oxidation-off gas flow passage 34 in which oxidation-off gas discharged from the fuel cell 20 flows. The oxidant gas flow passage 33 is provided with an air compressor 32 which takes in oxidant gas from the atmosphere through a filter 31, and a shutoff valve A1 which shuts off supply of oxidant gas to the fuel cell 20. The oxidation-off gas flow passage 34 is provided with a shutoff valve A2 which shuts off discharge of oxidation-off gas from the fuel cell 20, and a backpressure regulator valve A3 which regulates an oxidant gas supply pressure.

The fuel gas supply system 40 has a fuel supply source 41, a fuel supply flow passage 43 which connects the fuel supply source 41 and the fuel cell 20 and in which fuel gas supplied from the fuel supply source 41 to the anode electrode of the fuel cell 20 flows, a circulation flow passage 44 which circulates fuel-off gas discharged from the fuel cell 20 to the fuel supply flow passage 43, a circulation pump 45 which pumps fuel-off gas in the circulation flow passage 44 to the fuel supply flow passage 43, and an exhaust/drain flow passage 46 which branches off from the circulation flow passage 44.

The fuel supply source 41 is constituted of, for example, a high-pressure hydrogen tank or a hydrogen absorbing alloy, and stores hydrogen gas at high pressure (for example, 35 to 70 MPa). A main stop valve H1 is provided at a supply port of the fuel supply source 41, and if the main stop valve H1 is opened, fuel gas flows from the fuel supply source 41 to the fuel supply flow passage 43. The main stop valve H1 functions as a first shutoff valve in the invention.

The fuel supply flow passage 43 is provided with a high pressure sensor 73 which detects a pressure of fuel supplied from the fuel supply source 41, an intermediate pressure sensor 74 which is provided on a downstream side from the high pressure sensor 73, a pressure reducing valve H2 which is provided between the high pressure sensor 73 and the intermediate pressure sensor 74, and an injector 42 which is provided between the intermediate pressure sensor 74 and the fuel cell 20. The high pressure sensor 73 and the intermediate pressure sensor 74 respectively function as a first pressure sensor and a second pressure sensor in the invention, and the injector 42 functions as a second shutoff valve in the invention.

The pressure reducing valve H2 has a mechanical pressure regulation mechanism in which the valve is opened with energizing force of an elastic member to allow gas to flow in a case where the difference between a pressure on an upstream side and a pressure on a downstream side exceeds a predetermined threshold, and decreases the pressure on the upstream side to a predetermined pressure regulation lower limit value (for example, 1.1 MPa). In this embodiment, the pressure reducing valve H2 is brought into a constant open state such that the pressure on the upstream side and the pressure on the downstream side are made equal to each other if the pressure on the downstream side becomes equal to or less than the predetermined pressure regulation lower limit value.

Fuel gas at high pressure (for example, 2 to 4 MPa) supplied by opening the main stop valve H1 is reduced in pressure to, for example, about 1.1 to 1.6 MPa by the pressure reducing valve H2, is further reduce in pressure to, for example, about 200 to 300 kPa by the injector 42, and is supplied to the fuel cell 20.

The exhaust/drain flow passage 46 branches off from the circulation flow passage 44, and the exhaust/drain flow passage 46 is provided with an exhaust/drain valve H3. The exhaust/drain valve H3 is operated according to a command from the controller 60 to discharge fuel-off gas and moisture containing an impurity in the circulation flow passage 44 to the outside.

Fuel-off gas discharged through the exhaust/drain valve H3 is mixed with oxidation-off gas flowing in the oxidation-off gas flow passage 34, and is diluted by a diluter (not shown). The circulation pump 45 circulates and supplies fuel-off gas in a circulation system to the fuel cell 20 through a motor drive.

The electric power system 50 has a DC/DC converter 51, a battery 52, a traction inverter 53, a traction motor 54, and accessories 55. The DC/DC converter 51 has a function of boosting a DC voltage supplied from the battery 52 and outputting the resultant DC voltage to the traction inverter 53, and a function of deboosting DC electric power generated by the fuel cell 20 or regenerative electric power collected by the traction motor 54 through regenerative braking and charging the battery 52 with the resultant electric power.

The battery 52 functions as a storage source of surplus electric power, a regenerative energy storage source at the time of regenerative braking, an energy buffer at the time of load fluctuation with acceleration or deceleration of a fuel cell vehicle, or the like. As the battery 52, for example, a secondary battery, such as a nickel-cadmium storage battery, a nickel-hydrogen storage battery, or a lithium secondary battery, is suitably used.

The traction inverter 53 is a PWM inverter which is driven, for example, by a pulse-width modulation system, converts a DC voltage output from the fuel cell 20 or the battery 52 to a three-phase AC voltage according to a control command from the controller 60, thereby controlling rotation torque of the traction motor 54. The traction motor 54 is, for example, a three-phase AC motor, and constitutes a power source of a fuel cell vehicle.

The accessories 55 collectively refer to respective motors provided in the respective units of the fuel cell system 10, inverters for driving these motors, and various in-vehicle accessories (for example, the air compressor 32, the injector 42, the circulation pump 45, a radiator, a cooling water circulation pump, and the like).

The controller 60 is a computer system including a CPU, a ROM, a RAM, and an input/output interface, and controls the respective units of the fuel cell system 10. For example, if a start signal IG output from an ignition switch is received, the controller 60 starts the operation of the fuel cell system 10, and calculates required electric power of the entire system based on an accelerator pedal angle signal ACC output from an accelerator sensor, a vehicle speed signal VC output from a vehicle speed sensor, or the like. The required electric power of the entire system is a total value of vehicle traveling electric power and accessory electric power.

The accessory electric power includes electric power consumed in the in-vehicle accessories (the air compressor 32, the circulation pump 45, the cooling water circulation pump, and the like), electric power consumed in devices (transmission, wheel control device, steering device, suspension device, and the like) necessary for vehicle traveling, electric power consumed in devices (air conditioner, lighting device, audio, and the like) provided in an occupant space, and the like.

The controller 60 determines distribution of output electric power of each of the fuel cell 20 and the battery 52, controls oxidant gas supply system 30 and the fuel gas supply system 40 such that the power generation amount of the fuel cell 20 matches target electric power, and controls the DC/DC converter 51 to regulate the output voltage of the fuel cell 20, thereby controlling the operation point (output voltage and output current) of the fuel cell 20.

At the time of the operation of the fuel cell system 10, in the fuel cell 20, as represented in Formula (1) described above, hydrogen ions generated on the anode electrode are permeated through the electrolyte membrane and moved to the cathode electrode, and the hydrogen ions moved to the cathode electrode undergo an electrochemical reaction with oxygen in oxidant gas supplied to the cathode electrode as represented in Formula (2) described above and cause a reduction reaction of oxygen to generate water.

The controller 60 functions so as to control the main stop valve H1 and the injector 42 and to determine whether or not the high pressure sensor 73 or the intermediate pressure sensor 74 is abnormal. Specifically, the controller 60 closes the main stop valve H1 to shut off supply of fuel from the fuel supply source 41 to the high pressure sensor 73, then, opens the injector 42 and allows fuel in the fuel supply flow passage 43 to be supplied to the fuel cell 20 to decrease the pressure on the upstream side and the pressure on the downstream side of the pressure reducing valve H2 to be equal to or less than the pressure regulation lower limit value. Subsequently, the controller 60 closes the injector 42 and compares the detection pressure values of the high pressure sensor 73 and the intermediate pressure sensor 74 with each other to determine whether or not the high pressure sensor 73 or the intermediate pressure sensor 74 is abnormal. That is, the controller 60 functions as a control determination unit in the invention.

The controller 60 functions so as to determine whether or not the high pressure sensor 73 is abnormal based on a hydrogen consumption amount estimated from the electric power generation amount of the fuel cell 20. Specifically, the controller 60 calculates the residual amount (reference fuel amount) of fuel based on the detection value of the high pressure sensor 73 and calculates the residual amount (fuel amount for determination start) at a pressure value obtained by subtracting a predetermined pressure value (for example, 3 MPa) from the detection value. The controller 60 calculates the fuel amount (predetermined pressure corresponding fuel amount) corresponding to the predetermined pressure value by subtracting the fuel amount for determination start from the reference fuel amount, and calculates an estimated fuel consumption amount based on the FC electric power generation amount and executes determination of an abnormality in the high pressure sensor 73 in the following manner when the estimated fuel consumption amount exceeds the predetermined pressure corresponding fuel amount.

That is, the controller 60 calculates the value (A) obtained by subtracting the estimated fuel consumption amount from the reference fuel amount, the residual amount (B) of fuel at the pressure value obtained by adding the predetermined pressure value (for example, 1 MPa) to the current detection value of the high pressure sensor 73, and the residual amount (C) of fuel at the pressure value obtained by subtracting the predetermined pressure value (for example, 1 MPa) from the current detection value of the high pressure sensor 73, and in a case where B is equal to or greater than A and C is equal to or less than A, determines that the high pressure sensor 73 is normal. The controller 60 determines that the high pressure sensor 73 is abnormal in a case where B exceeds A or in a ease where C falls below A.

Figure 2:
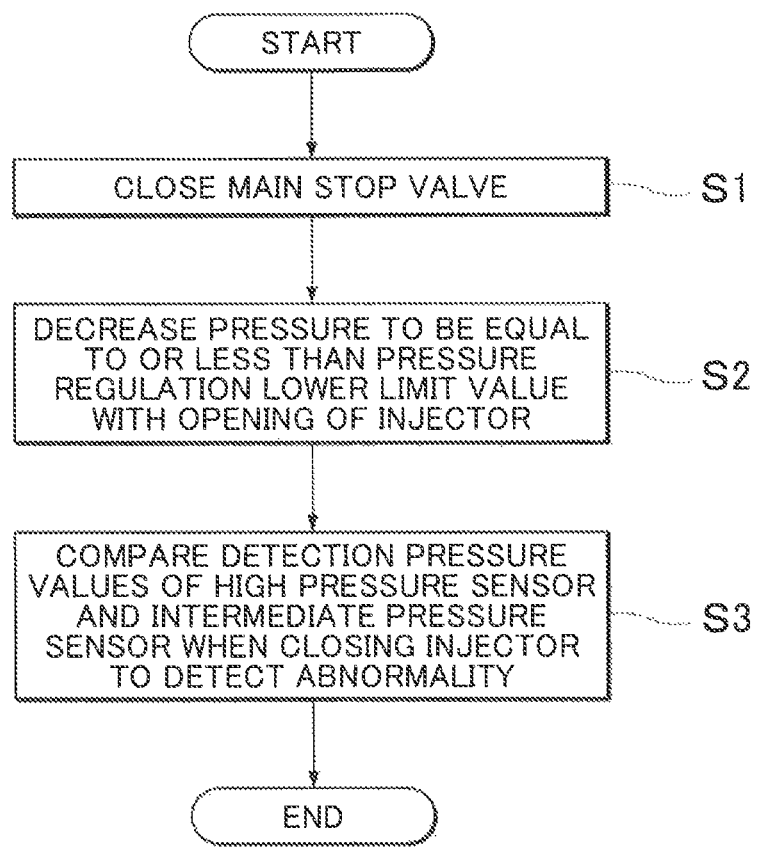
FIG. 2 is a flowchart illustrating a method of detecting an abnormality in pressure sensors of the fuel cell system according to the embodiment of the invention.

Next, a method of detecting an abnormality in a pressure sensor of the fuel cell system 10 according to this embodiment will be described referring to the flowchart of FIG. 2. The method of detecting an abnormality according to the embodiment is a method in which a so-called out-of-gas state is intentionally created, the high pressure sensor 73 and the intermediate pressure sensor 74 are provided in the same pressure space, and the detection values of the both pressure sensors are compared with each other, thereby detecting offset fault of the high pressure sensor 73 (or the intermediate pressure sensor 74).

First, the controller 60 of the fuel cell system 10 closes the main stop valve H1 to shut off the supply of fuel from the fuel supply source 41 to the high pressure sensor 73 (fuel shutoff step: S1). Next, the controller 60 opens the injector 42 and allows fuel in the fuel supply flow passage 43 to be supplied to the fuel cell 20 to decrease the pressure on the upstream side and the pressure on the downstream side of the pressure reducing valve H2 to be equal to or less than the pressure regulation lower limit value (pressure decrease step: S2).

Subsequently, the controller 60 closes the injector 42 and compares the detection pressure values of the high pressure sensor 73 and the intermediate pressure sensor 74 with each other to determine whether or not offset fault occurs in the high pressure sensor 73 or the intermediate pressure sensor 74 (abnormality determination step: S3). In the abnormality determination step S3, the controller 60 can determine that offset fault occurs in the high pressure sensor 73 or the intermediate pressure sensor 74, for example, in a case where the difference between the detection pressure values of the high pressure sensor 73 and the intermediate pressure sensor 74 exceeds the predetermined threshold. The controller 60 may compare the temporal histories (waveforms) of the detection pressure values of the high pressure sensor 73 and the intermediate pressure sensor 74 with each other, and in a case where the difference between both waveforms exceeds a predetermined reference, may determine that offset fault occurs in the high pressure sensor 73 or the intermediate pressure sensor 74.

In the fuel cell system 10 according to the embodiment described above, in a state in which the main stop valve H1 and the injector 42 are operated to decrease the pressure on the upstream side and the pressure on the downstream side of the pressure reducing valve H2 to be equal to or less than the predetermined pressure regulation lower limit value (a state where the pressure on the upstream side and the pressure on the downstream side of the pressure reducing valve H2 are made equal to each other), the detection pressure values of the main stop valve H1 and the injector 42 are compared with each other, whereby it is possible to detect offset fault of the high pressure sensor 73 or the intermediate pressure sensor 74. Therefore, there is no need for providing a sensor for comparison for detecting offset fault of the high pressure sensor 73 (or the intermediate pressure sensor 74), and simplification (non-redundancy) of the configuration becomes possible. For this reason, it is possible to suppress an increase in manufacturing costs of the system.

In this embodiment, although an example where the respective steps (the fuel shutoff step S1, the pressure decrease step 52, and the abnormality determination step S3) are executed by the controller 60 (control determination unit) of the fuel cell system 10 to detect offset fault of the pressure sensors has been described, an operator may execute these steps to detect offset fault of the pressure sensors. In this embodiment, although an example where the injector 42 (injection valve) is employed as the second shutoff valve, an electromagnetic control valve different from the injector 42 may be employed as the second shutoff valve.

In this embodiment, although the "fuel cell vehicle" has been illustrated as a moving object, the fuel cell system according to the invention may be mounted in various moving objects (robot, ship, airplane, and the like) other than the fuel cell vehicle.

The principle (a mechanical pressure reducing valve is provided between a high pressure space having a high pressure sensor and a low pressure sensor having a low pressure sensor, supply of gas to the high pressure space is shut off and gas is discharged from the low pressure space to intentionally create an out-of-gas state, the high pressure sensor and the low pressure sensor are provided in the same pressure space, and the detection values of both pressure sensors are compared with each other to detect offset fault of the high pressure sensor or the low pressure sensor) of the invention may be applied to a system (for example, a CNG vehicle, a gas pipeline, or the like) different from the fuel cell system.

The invention is not limited to the above-described embodiment, and design modifications to the embodiment, which will be made by those skilled in the art as appropriate, are also included in the scope of the invention as long as the modifications have the features of the invention. That is, the respective elements in the above-described embodiment and the arrangement, materials, conditions, shapes, sizes, and the like thereof are not limited to those illustrated and may be modified as appropriate. In addition, the respective elements in the above-described embodiment can be combined as long as such combination is technically possible, and such combination is also included in the scope of the invention as long as such combination includes the features of the invention.

What is claimed:

1. A method of detecting an abnormality in a pressure sensor of a fuel cell system including a fuel supply flow passage configured to connect a fuel cell and a fuel supply source, a first pressure sensor provided in the fuel supply flow passage, a second pressure sensor provided on a downstream side of the fuel supply flow passage from the first pressure sensor, a pressure reducing valve provided between the first pressure sensor and the second pressure sensor in the fuel supply flow passage and configured to decrease a pressure on an upstream side to a predetermined pressure regulation lower limit value, a first shutoff valve provided between the fuel supply source and the first pressure sensor in the fuel supply flow passage, and a second shutoff valve provided between the second pressure sensor and the fuel cell in the fuel supply flow passage, the method comprising:

closing the first shutoff valve to shut off supply of fuel from the fuel supply source to the first pressure sensor;

after shutting off the supply of fuel from the fuel supply source to the first pressure sensor, opening the second shutoff valve and allowing fuel in the fuel supply flow passage to be supplied to the fuel cell to decrease a pressure on an upstream side and a pressure on a downstream side of the pressure reducing valve to be equal to or less than the pressure regulation lower limit value; and after decreasing the pressure on the upstream side and the pressure on the downstream side of the pressure reducing valve to be equal to or less than the pressure regulation lower limit value, closing the second shutoff valve and comparing detection pressure values of the first pressure sensor and the second pressure sensor with each other to determine whether or not the first pressure sensor or the second pressure sensor is abnormal.

2. The method of detecting the abnormality in the pressure sensor according to claim 1, wherein, a control determination unit of the fuel cell system shuts off the supply of fuel from the fuel supply source to the first pressure sensor ,the control determination unit of the fuel cell system decreases the pressure on the upstream side and the pressure on the downstream side of the pressure reducing valve to equal to or less than the pressure regulation lower limit value, and the control determination unit of the fuel cell system executes the determination regarding whether or not the first pressure sensor or the second pressure sensor is abnormal.

3. The method of detecting the abnormality in the pressure sensor according to claim 1, wherein decreasing the pressure on the upstream side and the pressure on the downstream side of the pressure reducing valve to be equal to or less than the pressure regulation lower limit value is a state in which the pressure on the upstream side and the pressure on the downstream side of the pressure reducing valve are made equal to each other.

4. The method of detecting the abnormality in the pressure sensor according to claim 1, wherein, in a case where a difference between the detection pressure values of the first pressure sensor and the second pressure sensor exceeds a predetermined threshold, it is determined that the first pressure sensor or the second pressure sensor is abnormal.

5. The method of detecting the abnormality in the pressure sensor according to claim 1, wherein waveforms of the detection pressure values of the first pressure sensor and the second pressure sensor are compared with each other, and in a case where s difference between waveforms of the first pressure sensor and the second pressure sensor exceeds a predetermined reference, it is determined that the first pressure sensor or the second pressure sensor is abnormal.

6. The method of detecting the abnormality in the pressure sensor according to claim 1, wherein it is determined whether or not the first pressure sensor is abnormal based on a hydrogen consumption amount estimated from an amount of generated electric power of the fuel cell.

7. A fuel cell system comprising:

a fuel supply flow passage configured to connect a fuel cell and a fuel supply source;

a first pressure sensor provided in the fuel supply flow passage;

a second pressure sensor provided on a downstream side of the fuel supply flow passage from the first pressure sensor;

a pressure reducing valve provided between the first pressure sensor and the second pressure sensor in the fuel supply flow passage and configured to decrease a pressure on an upstream side to a predetermined pressure regulation lower limit value;

a first shutoff valve provided between the fuel supply source and the first pressure sensor in the fuel supply flow passage;

a second shutoff valve provided between the second pressure sensor and the fuel cell in the fuel supply flow passage; and a control determination unit configured to control the shutoff valves and to determine whether or not the pressure sensors are abnormal, wherein the control determination unit closes the first shutoff valve to shut off supply of fuel from the fuel supply source to the first pressure sensor, then, opens the second shutoff valve and allows fuel in the fuel supply flow passage to be supplied to the fuel cell to decrease a pressure on an upstream side and a pressure on a downstream side of the pressure reducing valve to be equal to or less than the pressure regulation lower limit value, and subsequently, closes the second shutoff valve and compares detection pressure values of the first pressure sensor and the second pressure sensor with each other to determine whether or not the first pressure sensor or the second pressure sensor is abnormal.

* * * * *